(12) United States Patent
Kuehnle

(10) Patent No.: US 7,025,705 B2
(45) Date of Patent: *Apr. 11, 2006

(54) TOROIDAL TRANSMISSION

(76) Inventor: Manfred R. Kuehnle, 22 Deer Run Rd., Lincoln, MA (US) 01773

( * ) Notice: Subject to any disclaimer, the term of this patent is extended or adjusted under 35 U.S.C. 154(b) by 73 days.

This patent is subject to a terminal disclaimer.

(21) Appl. No.: 10/704,361

(22) Filed: Nov. 7, 2003

(65) Prior Publication Data

US 2004/0147362 A1 Jul. 29, 2004

Related U.S. Application Data

(60) Provisional application No. 60/427,088, filed on Nov. 15, 2002.

(51) Int. Cl.
*F16H 57/08* (2006.01)
*F16H 55/32* (2006.01)
*H02K 1/12* (2006.01)
*H02K 1/22* (2006.01)

(52) U.S. Cl. .................. 475/331; 475/344; 476/72; 310/261; 310/254; 74/424.94

(58) Field of Classification Search .............. 475/331, 475/333, 344; 74/421 A, 425, 424.94, 465; 476/4, 11, 67, 72, 73; 310/261, 159, 164, 310/254, 268, 258, 156

See application file for complete search history.

(56) References Cited

U.S. PATENT DOCUMENTS

| 1,337,323 | A | | 4/1920 | Ostenberg |
| 1,661,593 | A | | 3/1928 | Bodker |
| 2,093,236 | A | * | 9/1937 | Dodge et al. ............ 475/47 |
| 3,242,755 | A | | 3/1966 | Kuehnle |
| RE26,476 | E | | 10/1968 | Kuehnle |
| 4,028,992 | A | | 6/1977 | Kuehnle |
| 4,297,919 | A | | 11/1981 | Kuehnle |
| 4,460,297 | A | | 7/1984 | Kuehnle |
| 5,784,923 | A | | 7/1998 | Kuehnle |
| 5,832,731 | A | | 11/1998 | Kuehnle |
| 5,863,273 | A | | 1/1999 | Kuehnle |
| 5,886,450 | A | | 3/1999 | Kuehnle |

FOREIGN PATENT DOCUMENTS

| WO | WO 98/20241 | 5/1998 |
| WO | WO 00/23691 | 4/2000 |
| WO | WO 02/079625 A1 | 10/2002 |

OTHER PUBLICATIONS

"Maximum Power Concentration in Gear Boxes Through XYZ Kinematics," Sep. 12, 2001.
"Hydrodynamic Oil Film Bearings," Jul. 6, 1998.

\* cited by examiner

*Primary Examiner*—Tisha Lewis
(74) *Attorney, Agent, or Firm*—Hamilton, Brook, Smith & Reynolds, P.C.

(57) ABSTRACT

A method is provided for optimally engineering a toroidal transmission having a desired input/output ratio to implement the desired ratio of the transmission while meeting the torque and efficiency requirements of the design. Nanoparticle technology is used to manufacture the stator walls to replace the cutting and milling procedures now in use. A novel Mitchell bearing sleeve and its particular hydrodynamic lubrication and cooling method are proposed herein, as well as the introduction of a novel, ultra smooth, amorphous non-oxidizing contact sleeve material used to form the contact sleeve of the drive rollers. A novel self-lubricating system is further provided that includes an oil reservoir disposed within an output shaft of the transmission.

13 Claims, 5 Drawing Sheets

TOROIDAL TRANSMISSION

RELATED APPLICATION

This application claims priority to U.S. Application No. 60/427,088, filed on Nov. 15, 2002, the entire teachings of which are incorporated herein by reference.

BACKGROUND OF THE INVENTION

Over many years, this inventor pursued various implementations of toroidal devices beginning with systems that would have an electronic output (missile nose cone signal transmitters), to very high reduction positioning devices (radar and telescopes), and, lately, to compact, high-torque power XYZ transmissions that can be used in, for example, trucks, automobiles, and marine vessels. Exemplary embodiments of toroidal drive transmissions are disclosed in U.S. Reissue Pat. No. 26,476, issued on Oct. 8, 1968; U.S. Pat. No. 4,297,919, issued on Nov. 3, 1981; U.S. Pat. No. 5,784,923, issued on Jul. 28, 1998; and U.S. Pat. No. 5,863,273, issued on Jan. 26, 1999. The entire teachings of the above documents are incorporated herein by reference.

A transmission of the type described in the above patents is depicted in FIG.1 . The load-sharing elements in this type of transmission comprise rotor units 10, each of which includes a hub 12, a ring 14 rotatably mounted coaxially to the hub, and a plurality of fingers 16 or rotor unit arms extending radially outward from the ring. The fingers are terminated by drive rollers 18. The rotors 10 are mounted via the hubs 12 to a large ring 20, which can be referred to as a yoke, centered on the common rotary axis of the transmission input and output shafts 22 and 24. The drive rollers 18 of radially extending inner fingers 16 of the rotor units 10 engage in the grooves of a worm 26 connected to the input shaft 22, and the ring 20 to which the rotor units 10 are mounted is connected by arms 28 to the output shaft 24.

The outer fingers 16 of the rotor units 10 engage in grooves or races 32 inscribed in the interior of a transmission housing 34. When the drive worm 26 is rotated by the input shaft 22, the various rotor units 10 are caused to rotate about their respective hubs 12. Since the rotors 10 also engage in the stator races 32, rotation of those rotors 10 causes the rotors to advance along the races which, in turn, causes the ring 20 to which the rotor units are attached to precess about the rotary axis of the transmission. Since the ring 20 is connected to the output shaft by arms 28, when the ring 20 rotates, so does the output shaft 24.

SUMMARY OF THE INVENTION

It is proposed to introduce nanoparticle technology to manufacture the stators to replace the cutting and milling procedures now in use. Since the hardness of nanoparticles increases with the square of the decrease in particle size, enormous benefits for durability are gained when Hot Isostatic Pressing (HIP) procedures are applied combined with surface nitriding. Further, this manufacturing process involves "zero waste", and enables the production of technically superior and economically attractive products.

A severe durability limit has existed in past toroidal products caused by the seemingly unavoidable use of needle bearings at the rotor arms. When the XYZ transmission operates at high input speeds, for example, 20,000 to 100,000 rotations per minute (rpm), the needles in the needle bearing turn at profound rpm rates, for example, 200,000 rpm.

A novel Mitchell bearing sleeve and its particular hydrodynamic lubrication and cooling method are proposed herein, as well as the introduction of a novel, ultra smooth, amorphous contact sleeve material used to form the contact sleeve of the drive rollers. In a particular embodiment, Tri-X material (manufactured by XMX Corporation of Waltham, Mass.) is used to form the contact sleeve. In a particular embodiment, Tri-X material has a melting temperature over about 3,000° C. (5,500° F.). Substantial limitations have thus been overcome, which allows operation of the transmission at high torques at high speeds without sustaining thermomechanically caused contact pressure damage.

Unlike in other gear transmissions that need an external oil pump to transport lubricating oil to points of high stress and high temperature, an embodiment of the present invention includes a device that facilitates the self-circulation of the lubricant. In the present invention, a lubricant such as oil, is provided in an internal reservoir inside the slower output shaft, and self-circulated to each rapidly spinning rotor unit and its rotating arms including its drive rollers at the end of each arm.

The engineering design of the present XYZ transmission departs radically from other gear transmissions whose proper functioning relies on maintaining tangential contact of the pitch diameters, under constant temperature, to assure proper tooth engagement. One aspect of the present invention allows wide latitude of temperatures and, therefore, expansions in the transmission in which the pitch diameter is permitted to change without affecting the precise engagement between rotor elements or rotor units and grooves. The rotor arms merely move deeper or less deep in the stator grooves without opening gaps between teeth or increasing their noise.

The input/output ratio of the XYZ transmission is determined by the number of rotations any rotor element makes as it precesses 360° in the stator multiplied by the number of revolutions the central drive worm must make to cause one rotation of the rotor unit. With a given size of a transmission, a wide range of ratios can be attained, typically covering the span of 12:1 to 98:1 using the above variables. Each different transmission ratio causes different lead angles of the grooves in the worm and the stator, which in turn require varied-positioning mounting angles for the rotor units on the yoke of the output shaft.

To obtain the mathematically mandatory lead and positioning angles, extensive inventive work was completed in XYZ space to devise the software for correctly machining the parts and fitting the rotor arms into the intersecting different lead angle grooves. Again, this fit demands XYZ three-dimensional precision or the entire principle does not work.

Accordingly, one aspect of the present invention includes software quintessential for machining and polishing the various grooves and machine components as well as for making the sinter forms for nanopowder forms whose sintered components are then Hot Isostatically Pressed (HIP'd).

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of embodiments of the invention follows.

To create a high-torque, high-speed, durable-under-heavy-load, advanced XYZ transmission, several inventions became necessary to achieve this heretofore elusive goal.

Figure 1:
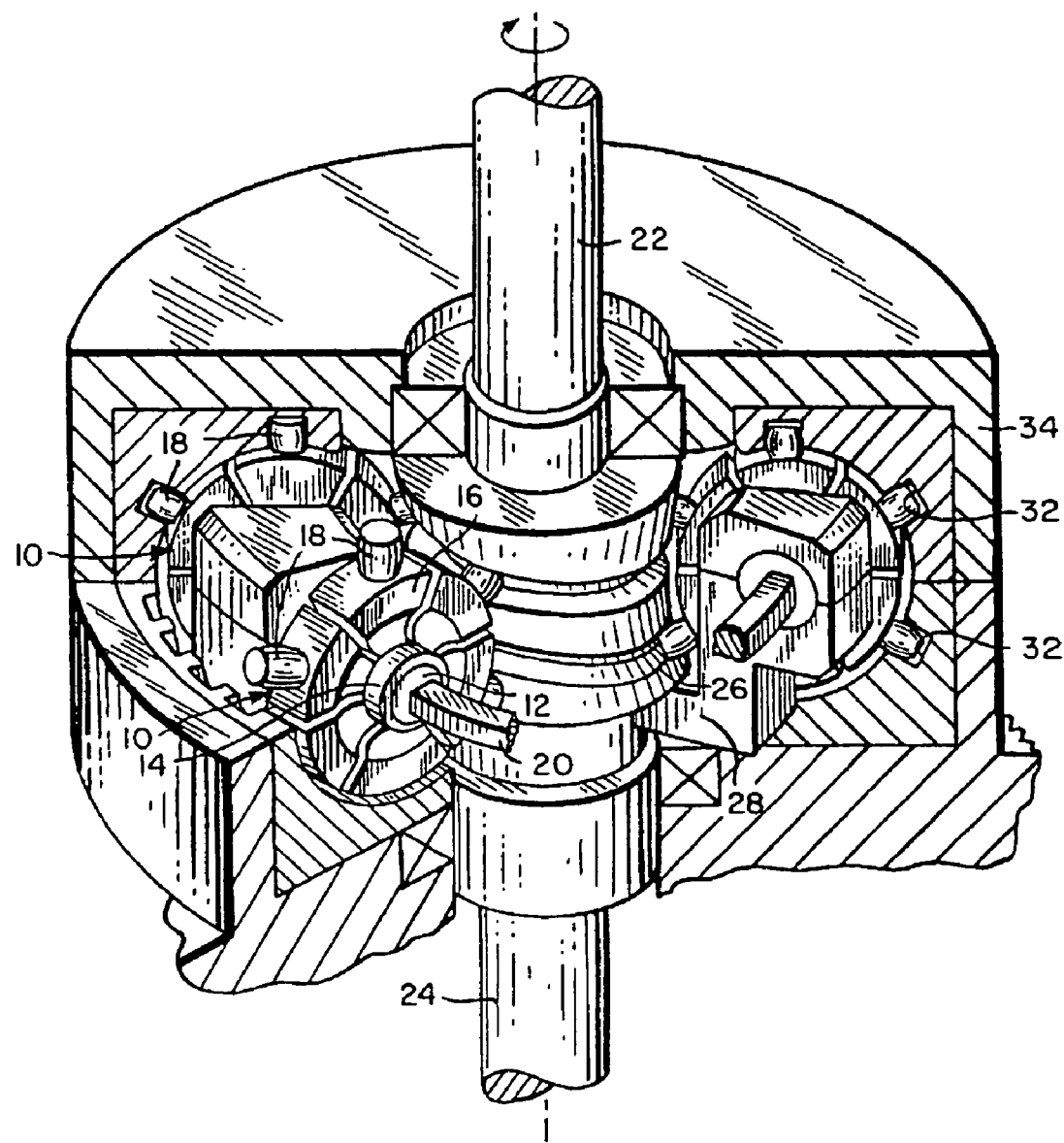
FIG. 1 is a perspective view partially broken away of a conventional toroidal power transmission.
Figure 2:
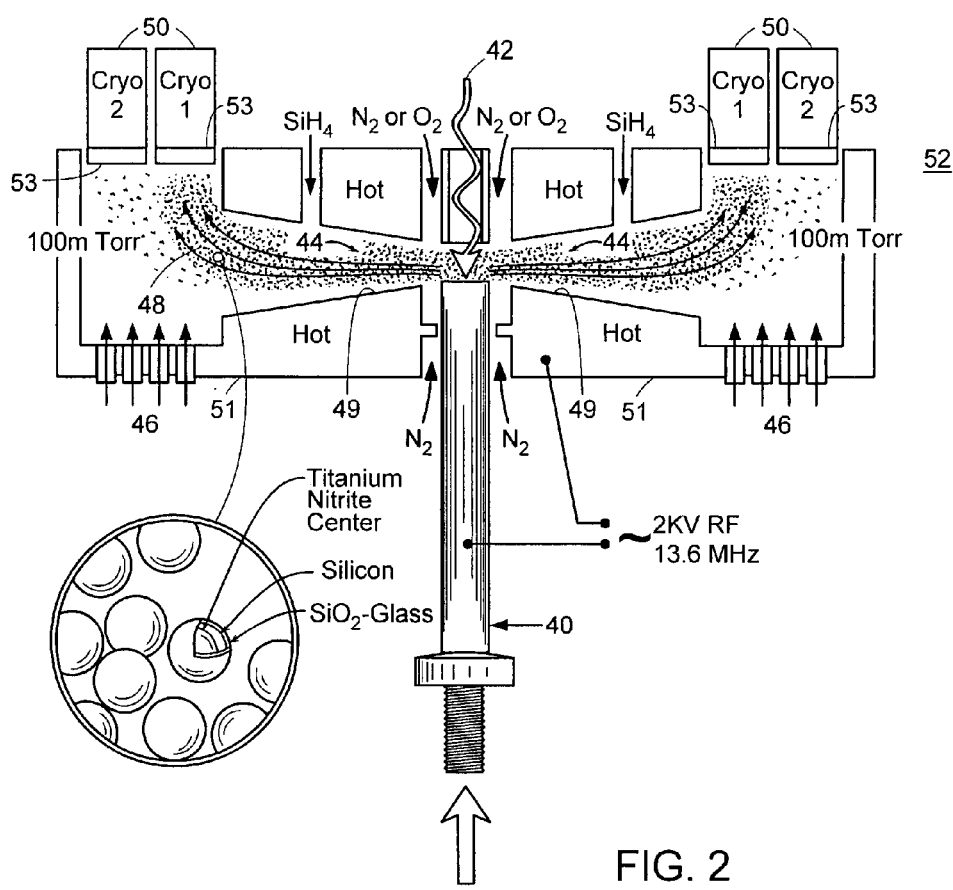
FIG. 2 is a diagram of machine for manufacturing monodispersed metal nanosize particles.

The first step was to invent a manufacturing process for making monodispersed, cube geometry, metal nanosize particles. FIG. 2 is illustrative of a vessel 52 used to form the nanosize particles. In this new process, metal 40, such as titanium or other suitable material, for example, aluminum, is vaporized inside a protective environment by laser beam 42 or electron beam energy. In a particular embodiment, the laser beam 42 can be generated by a $CO_2$ 10 KW laser. Vapor droplets 44 are allowed to escape radially from the vaporization chamber (via slits 49) in a laminar stream into surrounding environment. Due to the geometry of a radial/conical slit in the body member 51, the velocity of the vapor droplets 44 slows down as, simultaneously, the temperature drastically drops because of the radial expansion and vertically increasing height of the circumferential slits 49. This causes the solidification of the tiny liquid droplets (into particles 48) before they are swept away by an inert gas stream 46. The gas stream 46 flows toward one or more cryogenic pumps 50, which can be alternating cryogenic pumps, in whose ice receptacle 53, such as argon ice, the particles 48 become embedded.

The gas stream 46 can include additional elements, such as hexamethyldisolaxane (HMDS), or one or more monomers. In this embodiment, there are two or more cryopumps 50 so that this device is capable of continuously producing particles 48. Scorotron can be used to negatively charge the particles 48 so that they repel one another to avoid clumping of the particles.

When the ice evaporates after its removal from the cryopump 50, only a heap of non-pyrolytic nanopowder 48 remains, ready for further processing. By controlling droplet velocities, thermal gradients, and pressure differentials, as well as assuring laminar flow conditions (to avoid droplet collisions), it is possible to produce monodispersed, i.e., same size, non-agglomerated particles 48 of identical shape, chemistry, morphology, and particle surface properties. Additives such as lanthanum material can be used to form cubic geometry of the particles 48. In the embodiment in FIG. 2, nitrogen is fed into the member 51 on opposite sides to force the vapor droplets 44 into the slit 49. Oxygen can be used also, for example, to form glass particles. The particles 48 possess a mechanical hardness that is inversely proportional to the particle size $$\left(H = C^2 \sqrt{\frac{1}{S}}\right).$$

When Hot-Isostatically Pressed, the particles 48 collectively form a strong particulate body without interstitial vacancies between crystallites. The particles 48 can be placed in a separate autoclave vessel where heat and pressure are applied to the particles which causes them to begin to grow together, but are stopped short of becoming a single crystal block. In other words, the crystalline boundaries are still discernible, even though the intergrowth process has begun already. This stoppage is attained by the timely pressure release in the vessel 52 and the simultaneous temperature drop in the vessel. The result is a durable power transmission component (stators) which renders the high-performance, low-cost aspects the invention transmission requires. Cracks are prohibited from propagating throughout the hardened material. In a particular embodiment, TiN, $Al_2O_3N_2$(ALON), or other suitable hard material as formed, can be used to form the contact surface of the stator upon which the drive rollers engage. In a particular embodiment, the contact surface is usable in the transmission up to about 1,900° C. (3,500° F.).

To overcome limitations, such as speed and life, which are innate in normal needle bearings, novel sleeve bearings associated with each drive roller of the fingers of the rotor units are provided. The sleeve bearings together with the novel oil-feeding feature of the present invention offer low friction performance and high speed running and heat dissipation capability. These properties are obtained by choosing a metal alloy suitable for this purpose. In one embodiment, a metal alloy is provided whose melting temperature lies over about 3,000° C. (5,500° F.), whose surface is very smooth and slippery even without oil, but whose surface tension is substantially oleophilic to assure the uniform presence of an oil film. In a particular embodiment, Tri-X material manufactured by XMX Corporation is used to form at least a portion of the contact sleeve.

Figure 5:
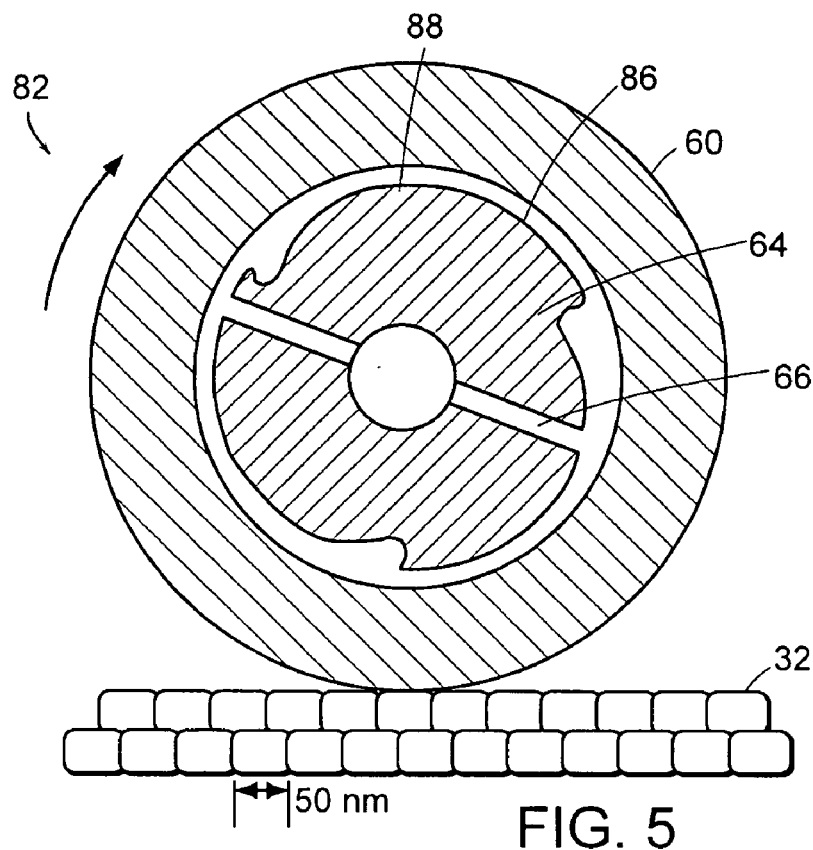
FIG. 5 is a cross-sectional view of the self-lubricating drive roller sleeve bearing taken at the line 5—5 in FIG. 7.

Apart from its unique morphology, the geometric shape of the contact sleeve 60 and mounting pins 64 of the drive rollers 82 are believed to be novel in this application. In the embodiment illustrated in FIGS. 5 and 7, the geometry of the mounting pin 64 of the rotor unit arm 80 is configured to provide hydrodynamic lubrication between the pin 64 and the contact sleeve 60, that is, an oil film separates the pin 64 and sleeve 60 during dynamic or running conditions.

In other embodiments, the inner bore of the contact sleeve 60, unlike journal bearings with a circular hole, can be shaped to enable the formation of an oil wedge in the partially conical gap. In a particular embodiment, the wedge 88 has a surface area of about 5.0 mm² and a contact surface of 0.5 mm² where the sleeve 60 contacts the stator surface. At stand-still condition, the oil is attracted via capillary action into the narrow spaces between the bore of the sleeve 60 and the pin 64 on which it is mounted. Under running conditions, however, a dynamic situation takes over that causes the oil from the several grooves to be sucked into the wedge spaces 88 while running under load to be also continuously centrifugally expelled.

Figure 6:
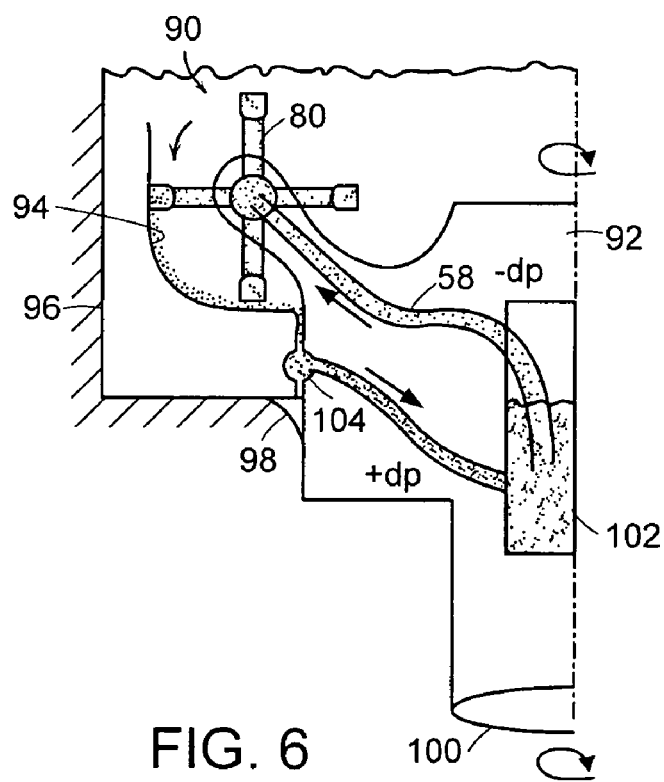
FIG. 6 is a partial sectional view of a toroidal power transmission in accordance with an embodiment of the present invention.

As illustrated in a partial cross-sectional view of the transmission in FIG. 6, the oil flow through the sleeve 60 bearings "cools" the metal surfaces as the oil flows centrifugally through the sleeves 60 to the outer perimeter of the drive rollers 82 of the rotor unit arms 80. From there, the oil returns, due to differential oil pressure, to its supply reservoir 102 that can be located within the hollow, slowly turning output shaft 100. In a particular embodiment, a respective supply tube 58 fluidly connects the oil reservoir 102 to a central hub of each rotor unit 90.

Figure 7:
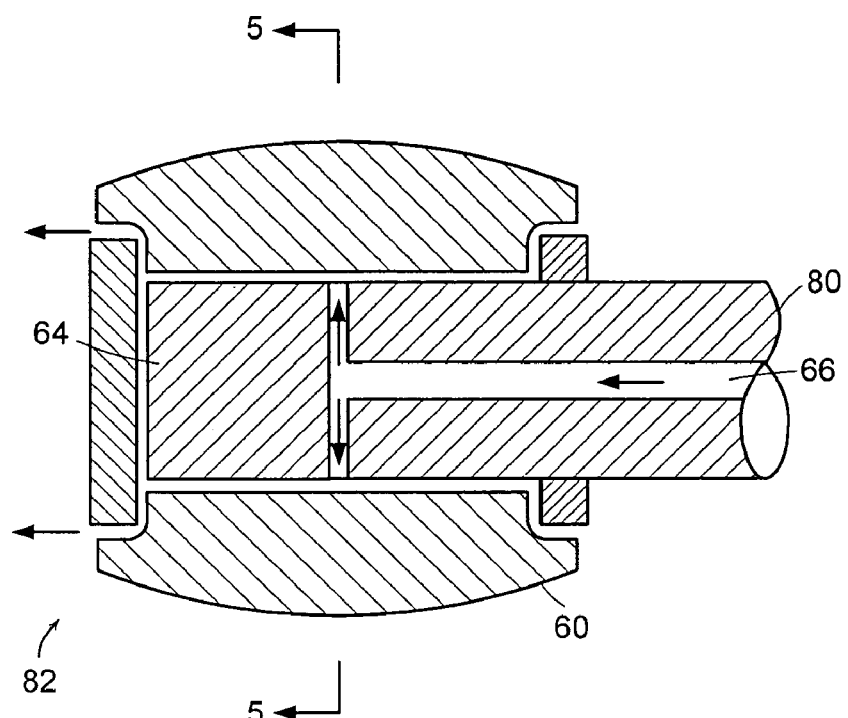
FIG. 7 is a partial longitudinal sectional view of the self-lubricating drive roller sleeve bearing of an embodiment of the present invention.

As shown in FIGS. 6 and 7, an oil-feed channel 66 in each rotor arm 80 allows the oil to be delivered between each mounting pin 64 and its respective sleeve 60 to provide the hydrodynamic lubrication. As the rotor arms 80 rotate through the toroidal path, centrifugal force moves the oil up through each supply tube 58, through rotor arms 80 and through the drive rollers 82. From there, the oil flows down along grooves or races 94 of the stator housing 96, through a connecting ring channel 104, and into the oil reservoir 102. This self-pumping, self-cooling lubrication system offers major advantages over and above any other high-performance transmission.

The persistent problem of shifting gear engagement pitch at varying pitch diameters due to thermal expansion of the gears and variations in shaft distances within the housing, with increases in the attendant gear noise and tooth wear, is overcome in the present invention transmission by the radial mounting of the rotor units 90. By suitably positioning the rotor units 90 on their yoke 92 mounts, these rotors 90 can move deeper or less deeply into the running grooves (stator and worm) without affecting the proper engagement (see FIG. 3).

To accommodate various input/output ratios within a given space, several variables are available to the engineer (all of which are interrelated): the number of threads or grooves on the worm; the number of arms on the rotor elements; and the number of toroidal grooves in the stator.

Figure 4:
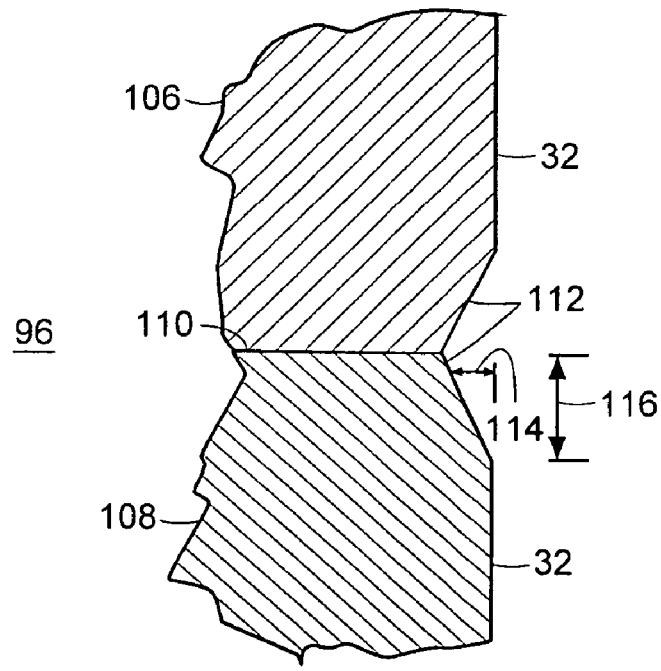
FIG. 4 is a partial cross-sectional view of a stator housing illustrating flared surfaces adjacent a split line in accordance with an embodiment of the present invention.

In other embodiments, the stator housing 96 can include a first or top section 106 and a second or bottom section 108 that meet at a split line 110 to form the enclosed housing (FIG. 4). If the two sections 106, 108 are not lined up in a precise fashion, the grooves or races 32 defined by the sections are also not lined up, resulting in a non-smooth surface over which the contact sleeves 60 pass, which can result in noisy operation of the transmission.

In specific embodiments, each section 106, 108 can be beveled or flared adjacent to the split line 110 in surfaces 112 that form the races 32. In one embodiment, the surfaces 112 are inclined 114 at about one degree and begin 116 at about 20 micrometers (0.79 mils) from the split line 110. Surfaces 112 provide a smoother transition for the sleeves 60 as they roll along the races 32 when the sections 106, 108 are not perfectly aligned.

Figure 3:
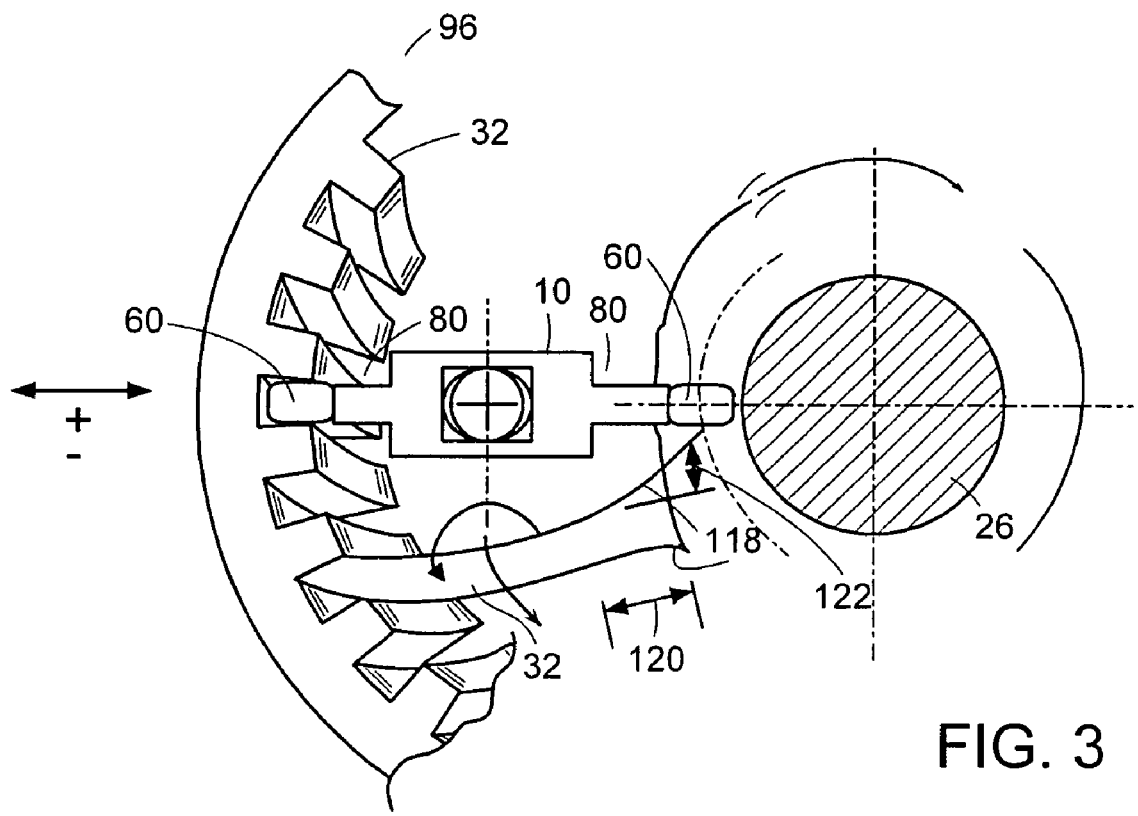
FIG. 3 is partial cross-sectional view of a toroidal transmission implemented in an embodiment of the present invention.

Similarly, the races 32 and/or grooves in the worm 26 can be tapered or bevel adjacent to where the sleeves 60 pass from the grooves in the worm 26 to the races 32 to provide a smooth transition even when the sections 106, 108 are not perfectly aligned. As illustrated in FIG. 3, an exemplary race 32 is shown having beveled or flared surfaces 118 that facilitate a smooth transition of the sleeves 60 exiting the grooves in the worm 26 and entering the races 32. In a particular embodiment, surfaces 118 can be about 1.5 mm (0.06 inches) long 120 and inclined 122 at about one degree.

In a particular embodiment, a method is provided for optimally designing a toroidal transmission, having a desired input/output ratio given the desired reduction or input/output ratio of the transmission, for example, 25:1, a design which maximizes torque of the transmission is determined as follows. Torque is measured as turning moment $Md=C*(Hp/rpm)$, where C is 7.162, HP is horsepower (the rate at which work is done), and rpm is revolutions per minute of the torque conveying input or output shaft, whichever is of interest.

Figure 8:
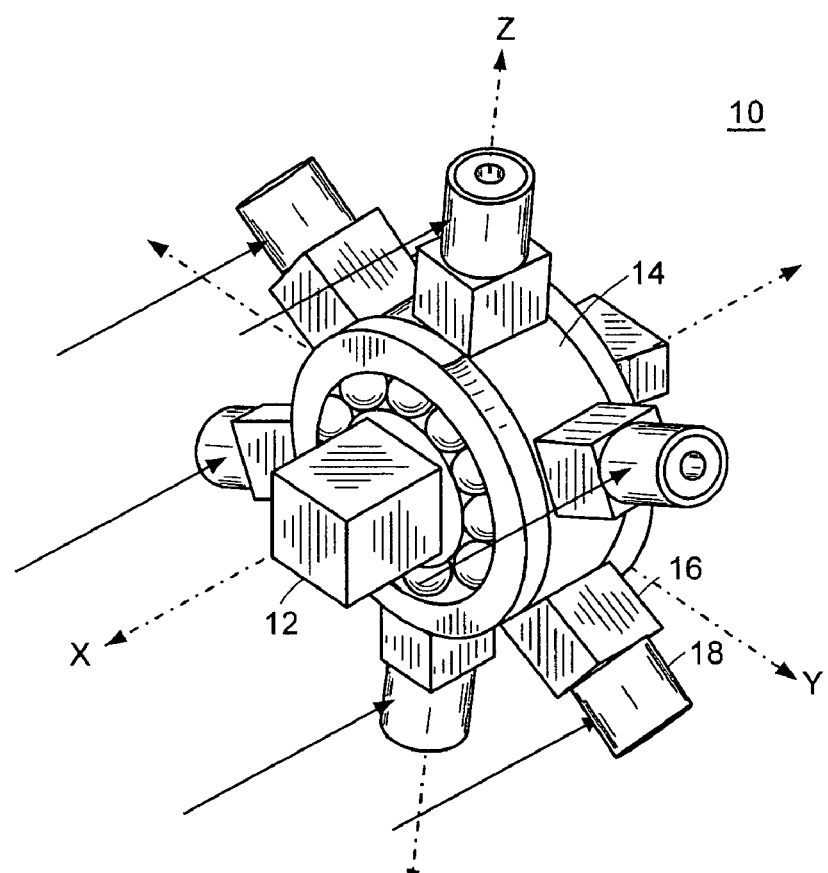
FIG. 8 is a perspective view of a rotor unit implemented in an embodiment of the present invention.

For a given reduction ratio and torque, a first step is to approximate diameters of the stator, worm, and sleeve pins and strength of the roller arms that can handle the required torques (input/output) (see FIG. 8). Typically, the worm diameter is about one-third the total diameter of the transmission at its widest part. Based on worm diameter, the total number of rotor arms that can physically fit without dimensional interference simultaneously around the worm is determined. This depends on the sleeve outer diameter chosen for the drive rollers of the rotor units. In turn, the sleeve outer diameter chosen determines the width of the toroidal grooves in the stator as well as the width of the worm groove.

So upon choosing a sleeve outer diameter, the width of the helical stator grooves, but not their number, and the width of the worm groove are determined. The circumference of the stator (calculated from the diameter determined in the first step above) then dictates the total number of stator grooves at the determined width (about the same as the chosen sleeve outer diameter) and with respective wall thickness between grooves possible. Candidate designs (having (i) n total number of stator grooves at the determined width and (ii) M wall thickness between grooves) are analyzed for stability and ranked. As such, threshold thinness (optimal thickness) M and bending strength of the stator walls which form stator grooves are determined such that the stator walls do not fail, i.e., break, during transmission use. To achieve a compact design for the required ratio, the roller elements must make multiple revolutions, such as three, four, or five, which, based on the number of arms a roller sleeve possesses, determines the outside diameter of the stator assuming each runs in a single set or multiple set of grooves.

As mentioned previously, the chosen sleeve (driver roller) outer diameter dictates the maximal number of rotor arms, and hence rotor units, that can simultaneously fit around the worm. The desired number of rotor units is optimized based on load sharing requirements. This in turn requires consideration of rotor unit design which includes rotor unit dimensions, number and strength of arms of each rotor unit, and angular placement of the rotor units on the yoke. Rotor unit dimensions are determined to provide sufficiently robust rotor units including a total number of arms of each rotor unit. The rotor units are mounted on the yoke at precise positions such that drive rollers of the rotor units are in rolling engagement with the stator grooves or races and worm grooves. More specifically, the drive rollers of each rotor arm are configured to be in rolling engagement with respective separate grooves (either stator side races or worm side groove) at a given moment.

The foregoing is accomplished in a particular embodiment by the following steps. Take an initial number of arms per rotor unit (this is the rotor ratio). Compare the rotor ratio to the given reduction ratio, and determine the number of rotations a rotor unit will make in a 360° precessional advance (i.e., one revolution about the stator).

In the given example, the reduction ratio is 25:1. Say each rotor has 6 arms or the rotor ratio is 6:1. Comparing reduction ratio to rotor ratio gives 25/6=4 rotations of the rotor unit to cause a 360° precessional advance. Because of the epicyclic nature, the transmission ratio will be ±1 depending on the direction of the groove angles.

Next, multiply the determined number of rotor unit rotations by the number of rotor arms. This product represents the minimal number of stator grooves. In the example, 6 rotor arms×4 rotations=24 needed stator grooves.

The total number of stator grooves (the above calculated minimum number or more) are evenly spaced about 360°. The total number of stator grooves is bounded by the stator circumference (π multiplied by the stator diameter previously determined) factoring in groove width (synonymous with the driver roller sleeve outer diameter) and the previously calculated optimal wall thickness M.

Accordingly, the driver roller sleeve outer diameter dictates (i) stator groove configuration (i.e., maximum number of grooves and wall thickness between grooves, given a stator diameter) and (ii) rotor unit design (i.e., maximum number of rotor units, or number of rotor arms per rotor unit, which determines a minimum number of stator grooves). This is mathematically stated:

$$d_w \approx \frac{1}{3} d_s \quad \text{Eq. 1}$$

$d_w$ is diameter of the worm
$d_s$ is diameter of the stator
$n$ = number of groove sets $$\pi \cdot d_s = \sum_{i=1}^{g_s} \cdot (T_w + W_g)i \quad \text{Eq. 2}$$

where $g_s$ is number of stator grooves
$T_w$ is thickness of groove wall at groove $i$
$W_g$ is width of groove $i$ given Reduction ratio/Rotor ratio×Number of arms per rotor=min ($g_s$)   Eq. 3

The above system of equations must be held true while maximizing torque (Md=C*Hp/rpm), maximizing number of arms per rotor unit for maximal load carrying ability and optimizing groove wall stability.

The toroidal transmission is designed by the present invention to include an optimum number of stator grooves to achieve the desired input/output ratio and at the same time include sufficiently robust stator and worm groove walls.

In summary, the overall design of the geometric construct shown above is optimized to achieve maximum compactness of the transmission while achieve maximum running efficiency and torque. Embodiments of the toroidal transmission can be implemented in a wide variety of applications, such as automotive wheel drives, helicopter main gearboxes, off-road vehicles, forklift platform drives, agricultural machines, hoists, winches, reverse flow tidal turbines, and wind propeller speed increasers/decreasers.

While this invention has been particularly shown and described with references to various embodiments thereof, it will be understood by those skilled in the art that various changes in form and details may be made therein without departing from the scope of the invention encompassed by the appended claims.

What is claimed is:

1. A toroidal transmission, comprising:
    a housing defining a plurality of helical stator races that define a toroidal cavity;
    a yoke disposed within the housing being fixedly attachable to a first shaft;
    a plurality of rotor units attachable to the yoke, each rotor unit having a plurality of arms and drive rollers that are configured to be in rolling engagement with the stator races; and
    a worm disposed within the housing engaging at least one drive roller of each of the plurality of rotor units, the worm being connectable to a second shaft;
    the stator races including a contact surface upon which the plurality of drive rollers engage, the contact surface being formed from monodispersed metal nanosize particles.

2. The toroidal transmission of claim 1, wherein the nanosize particles are disposed in a Hot Isostatically Pressed condition.

3. The toroidal transmission of claim 1, wherein the contact surface includes an aluminum surface in which nanosize crystallites of $Si_3N_4$ are embedded.

4. The toroidal transmission of claim 1, wherein the contact surface includes $Al_2O_3N_2$.

5. The toroidal transmission of claim 1, wherein the contact surface is usable in the transmission up to about 1,900° C.

6. The toroidal transmission of claim 1, wherein the contact surface, as formed, includes nanosize cube-shaped particles measuring about 50 nm on each side.

7. The toroidal transmission of claim 1, wherein the drive rollers are formed from a material that is usable in the transmission up to about 3,000° C.

8. The toroidal transmission of claim 1, wherein the drive rollers have a Rockwell C hardness value (HRC) of at least 70.

9. The toroidal transmission of claim 1, wherein the drive rollers are mounted on mounting pins that are carried by rotor unit arms of each rotor unit, wherein for each rotor unit arm, geometry of a mounting pin and an interior surface of a cooperating drive roller is configured to provide hydrodynamic lubrication.

10. The toroidal transmission of claim 8, wherein geometry of the mounting pin and the interior surface of the cooperating drive roller is configured to form an oil wedge on the interior surface of the drive roller while providing an inlet and outlet aperture to facilitate oil flow.

11. The toroidal transmission of claim 1, wherein the transmission is implemented in at least one of automotive wheel drives, helicopter main gearboxes, off-road vehicles, forklift platform drives, agricultural machines, hoists, winches, reverse flow tidal turbines, and wind propeller speed increasers/decreasers.

12. The toroidal transmission of claim 1, wherein the stator races are beveled and/or flared adjacent to the worm.

13. The toroidal transmission of claim 1, wherein the housing includes a first section and a second section that meet at a split line, the stator races being beveled and/or flared adjacent to the split line.

* * * * *